(12) United States Patent
Hall et al.

(10) Patent No.: US 11,246,305 B2
(45) Date of Patent: Feb. 15, 2022

(54) TINED MOLE TRAP APPARATUS

(71) Applicants: Scott Hall, Battle Ground, WA (US); Sandra Hall, Battle Ground, WA (US)

(72) Inventors: Scott Hall, Battle Ground, WA (US); Sandra Hall, Battle Ground, WA (US)

(*) Notice: Subject to any disclaimer, the term of this patent is extended or adjusted under 35 U.S.C. 154(b) by 237 days.

(21) Appl. No.: 16/662,841

(22) Filed: Oct. 24, 2019

(65) Prior Publication Data

US 2021/0120805 A1  Apr. 29, 2021

(51) Int. Cl.
*A01M 23/26* (2006.01)
*A01M 23/28* (2006.01)

(52) U.S. Cl.
CPC .......... *A01M 23/265* (2013.01); *A01M 23/26* (2013.01); *A01M 23/28* (2013.01)

(58) Field of Classification Search
CPC .... A01M 23/24; A01M 23/245; A01M 23/26; A01M 23/265; A01M 23/28
USPC ..................... 43/80, 85, 86, 88–97
See application file for complete search history.

(56) References Cited

U.S. PATENT DOCUMENTS

| | | | | |
|---|---|---|---|---|
| 69,878 A | * | 10/1867 | Westcott | A01M 23/265 43/94 |
| 92,823 A | * | 7/1869 | Harwood | A01M 23/265 43/94 |
| 280,811 A | * | 7/1883 | Gilleland et al. | A01M 23/265 43/94 |
| 288,225 A | * | 11/1883 | Gilleland | A01M 23/265 43/94 |
| 472,038 A | * | 4/1892 | Durston | A01M 23/265 43/94 |
| 615,851 A | * | 12/1898 | Hooker | A01M 23/26 43/88 |
| 689,324 A | | 12/1901 | Rittenhouse | |
| 1,296,407 A | * | 3/1919 | Layton | A01M 23/26 43/88 |
| 1,557,043 A | * | 10/1925 | Freemont | A01M 23/265 43/88 |
| 1,729,976 A | * | 10/1929 | Wyman | A01M 23/265 43/88 |
| 1,764,225 A | * | 6/1930 | Raymond | A01M 23/26 43/88 |

(Continued)

FOREIGN PATENT DOCUMENTS

| | | | | |
|---|---|---|---|---|
| AT | 2125 U1 | * | 5/1998 | ............ A01M 23/26 |
| CA | 1106175 A | * | 8/1981 | .......... A01M 23/265 |

(Continued)

*Primary Examiner* — Darren W Ark

(57) ABSTRACT

A tined mole trap apparatus for catching moles of all sizes and preventing escape includes a pair of jaws comprising an outer jaw and an inner jaw. Each of the pair of jaws have a U-shaped upper portion and a pair of curved outer arms extending from the upper portion. A pair of crossbars is coupled between the pair of outer arms proximal the upper portion. A plurality of tines is coupled to the pair of crossbars. A pivot rod is coupled through the upper portion of each of the pair of jaws such that the inner jaw pivotably moves within the outer jaw between a clamped position and a spread position. A spring engages the pair of crossbars to force the pair of jaws towards the clamped position. A trigger plate is coupled to the crossbar of the inner jaw. A set rod maintains the pair of jaws in the spread position.

9 Claims, 5 Drawing Sheets

(56) References Cited

U.S. PATENT DOCUMENTS

| | | | | |
|---|---|---|---|---|
| 1,924,241 A * | 8/1933 | Hassler | | A01M 23/265 43/94 |
| 2,432,723 A * | 12/1947 | Edgar | | A01M 23/26 43/88 |
| 2,525,383 A * | 10/1950 | Troutman | | A01M 23/265 43/94 |
| 2,593,816 A * | 4/1952 | Vigness | | A01M 23/24 43/88 |
| 3,013,358 A | 12/1961 | Wilken | | |
| 3,896,581 A * | 7/1975 | Gabry | | A01M 23/26 43/81 |
| 4,245,424 A * | 1/1981 | Smith | | A01M 23/28 43/97 |
| D270,174 S | 8/1983 | Gaines | | |
| 4,765,087 A * | 8/1988 | Holtgrefe, Sr. | | A01M 23/265 43/94 |
| 5,307,587 A * | 5/1994 | Zeiger | | A01M 23/265 43/88 |
| 6,101,761 A * | 8/2000 | Sprick | | A01M 23/265 43/85 |
| D469,146 S * | 1/2003 | Schroedl | | D22/119 |
| 6,578,314 B1 * | 6/2003 | Schmidt | | A01M 23/265 43/85 |
| 6,802,152 B2 | 10/2004 | Hagen | | |
| 6,868,633 B2 * | 3/2005 | Schroedl | | A01M 23/26 43/80 |
| 7,104,005 B2 * | 9/2006 | Holtgrefe, Sr. | | A01M 23/265 43/85 |
| 7,204,053 B1 * | 4/2007 | Holtgrefe, Sr. | | A01M 23/265 43/88 |
| 7,779,574 B1 | 8/2010 | Miller | | |
| 8,042,299 B1 | 10/2011 | Brown, Jr. | | |
| 8,429,848 B2 * | 4/2013 | Walsh | | A01M 27/00 43/80 |
| 10,034,470 B2 | 7/2018 | Clark | | |
| 2007/0193108 A1 * | 8/2007 | Gordon | | A01M 23/265 43/88 |
| 2017/0265452 A1 * | 9/2017 | Leasure | | A01M 23/26 |

FOREIGN PATENT DOCUMENTS

| | | | | | |
|---|---|---|---|---|---|
| DE | 648734 C | * | 8/1937 | | A01M 23/26 |
| DE | 670843 C | * | 1/1939 | | A01M 23/26 |
| DE | 847373 C | * | 8/1952 | | A01M 23/265 |
| DE | 3819871 A1 | * | 12/1988 | | A01M 23/265 |
| DE | 9317195 U1 | * | 1/1994 | | A01M 23/265 |
| FR | 743580 A | * | 4/1933 | | A01M 23/265 |
| FR | 2662580 B1 | * | 8/1993 | | A01M 23/24 |
| FR | 2726736 A1 | * | 5/1996 | | A01M 23/265 |
| GB | 446717 A | * | 5/1936 | | A01M 23/265 |
| KR | 200425812 Y1 | * | 9/2006 | | |

* cited by examiner

TINED MOLE TRAP APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR Not Applicable

BACKGROUND OF THE INVENTION

(1) Field of the Invention

The disclosure relates to mole traps and more particularly pertains to a new mole trap for catching moles of all sizes and preventing escape.

(2) Description of Related Art Including Information Disclosed Under 37 CFR 1.97 and 1.98

The prior art relates to mole traps.

BRIEF SUMMARY OF THE INVENTION

An embodiment of the disclosure meets the needs presented above by generally comprising a pair of jaws comprising an outer jaw and an inner jaw. Each of the pair of jaws have a U-shaped upper portion and a pair of curved outer arms extending from the upper portion. The curvature of the pair of outer arms of the outer jaw and the inner jaw is mirrored. A pair of crossbars is coupled between the pair of outer arms proximal the upper portion. A plurality of tines is coupled to the pair of crossbars. The curvature of the tines matches the pair of outer arms coupled to the respective crossbar. A pivot rod is coupled through the upper portion of each of the pair of jaws such that the inner jaw pivotably moves within the outer jaw between a clamped position and a spread position. A spring is coupled around the pivot rod. The spring engages the pair of crossbars to force the pair of jaws towards the clamped position. A trigger plate is coupled to the crossbar of the inner jaw. A set rod is pivotably coupled to the upper portion of the outer jaw and a distal end is selectively engageable with the trigger plate to maintain the pair of jaws in the spread position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
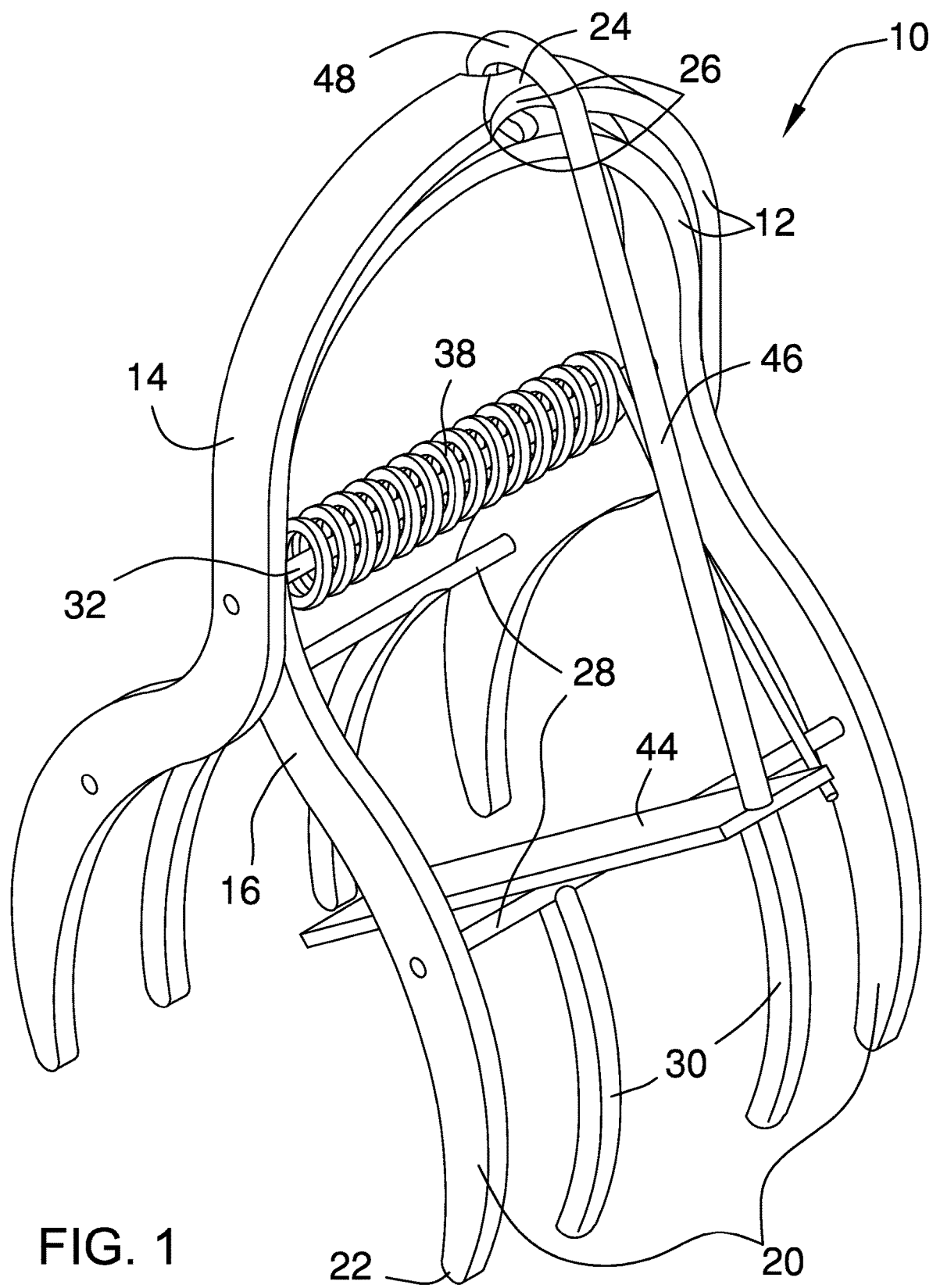
FIG. 1 is an isometric view of a tined mole trap apparatus according to an embodiment of the disclosure.
Figure 2:
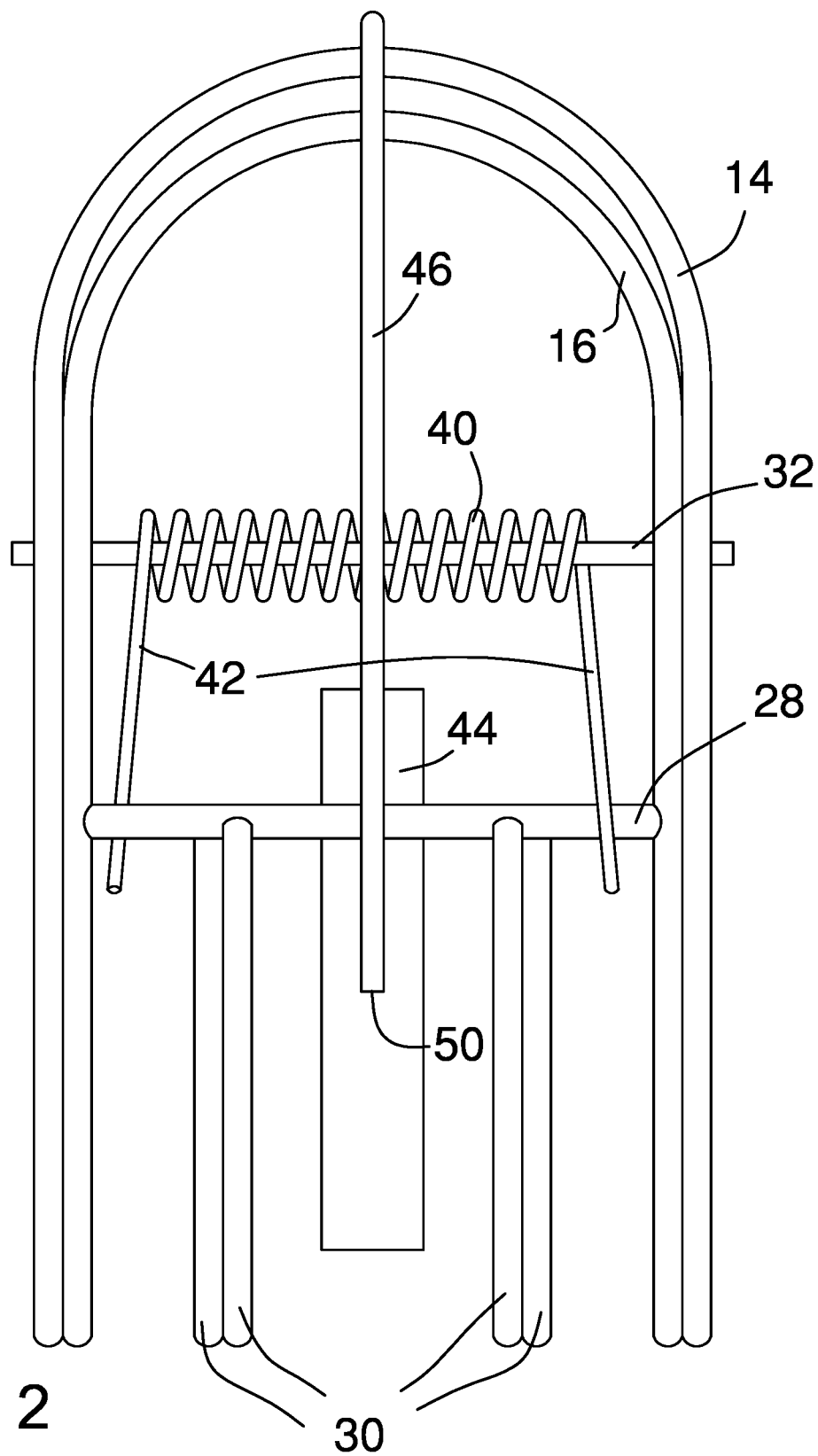
FIG. 2 is a front elevation view of an embodiment of the disclosure.
Figure 3:
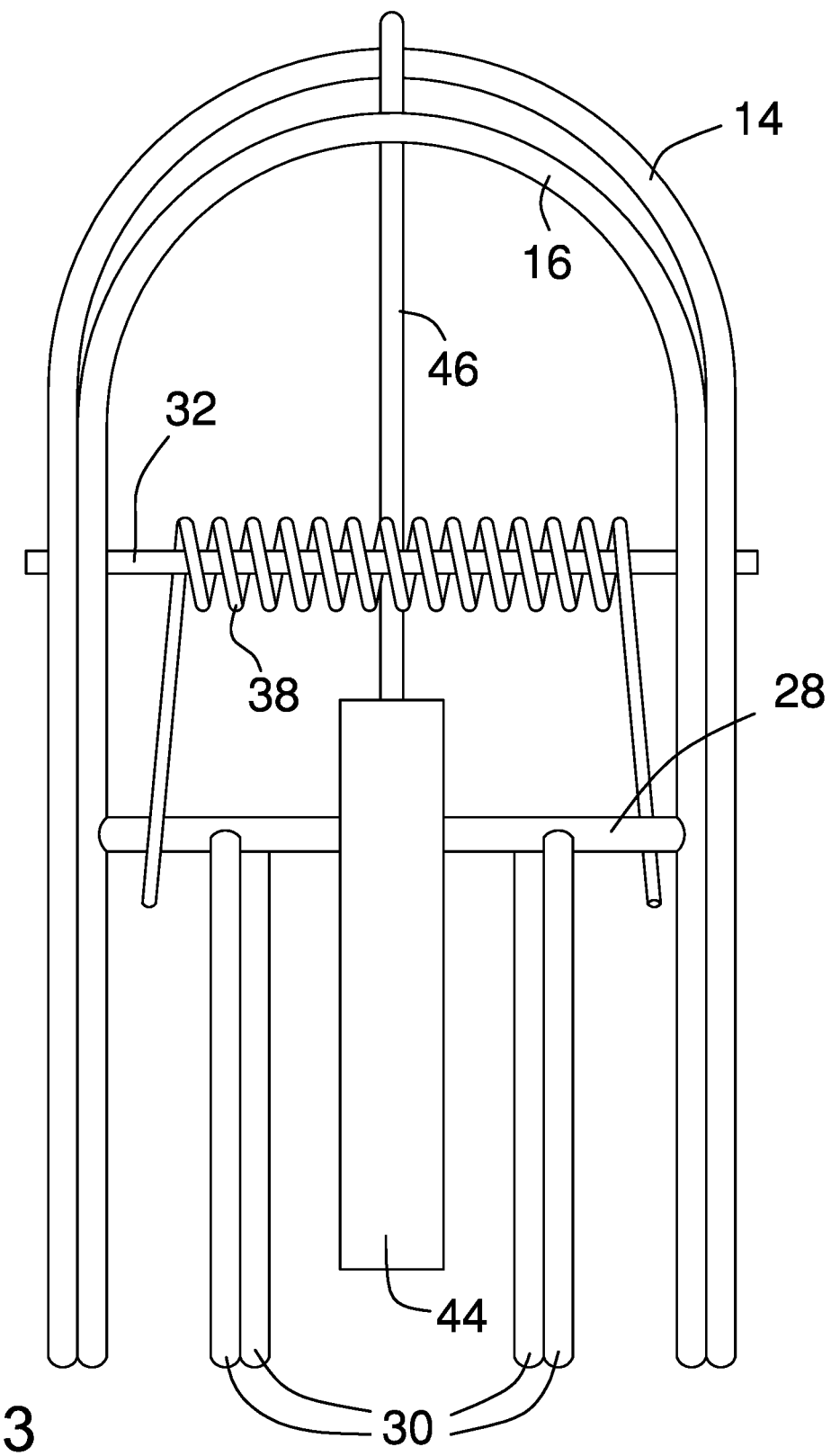
FIG. 3 is a rear elevation view of an embodiment of the disclosure.
Figure 4:
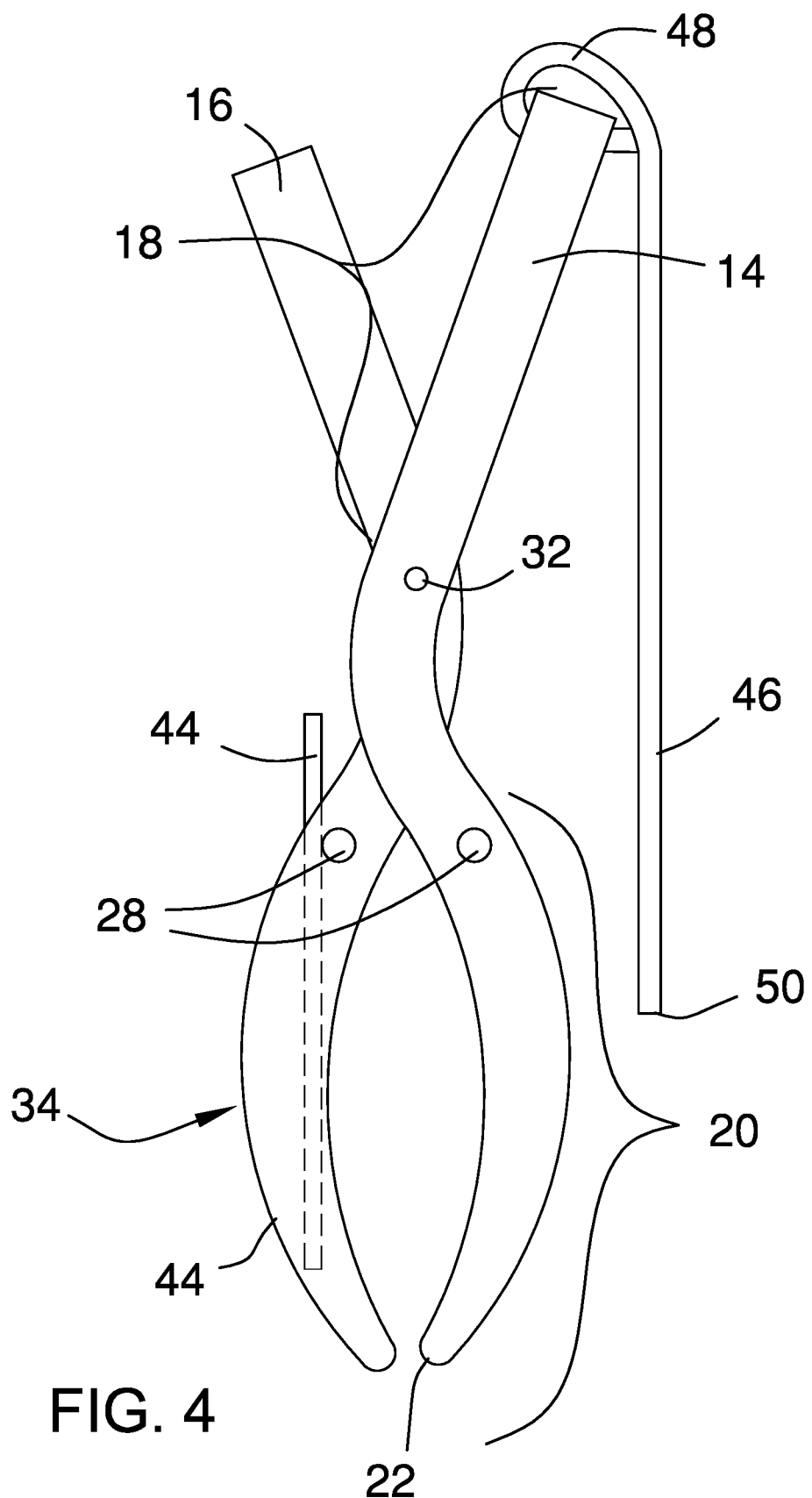
FIG. 4 is a side elevation view of an embodiment of the disclosure.
Figure 5:
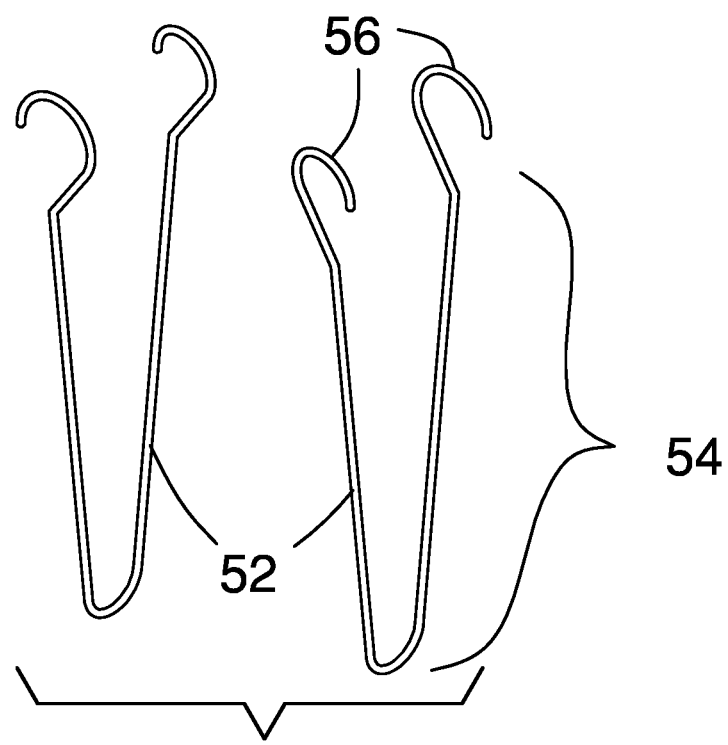
FIG. 5 is an isometric view of an embodiment of the disclosure.
Figure 6:
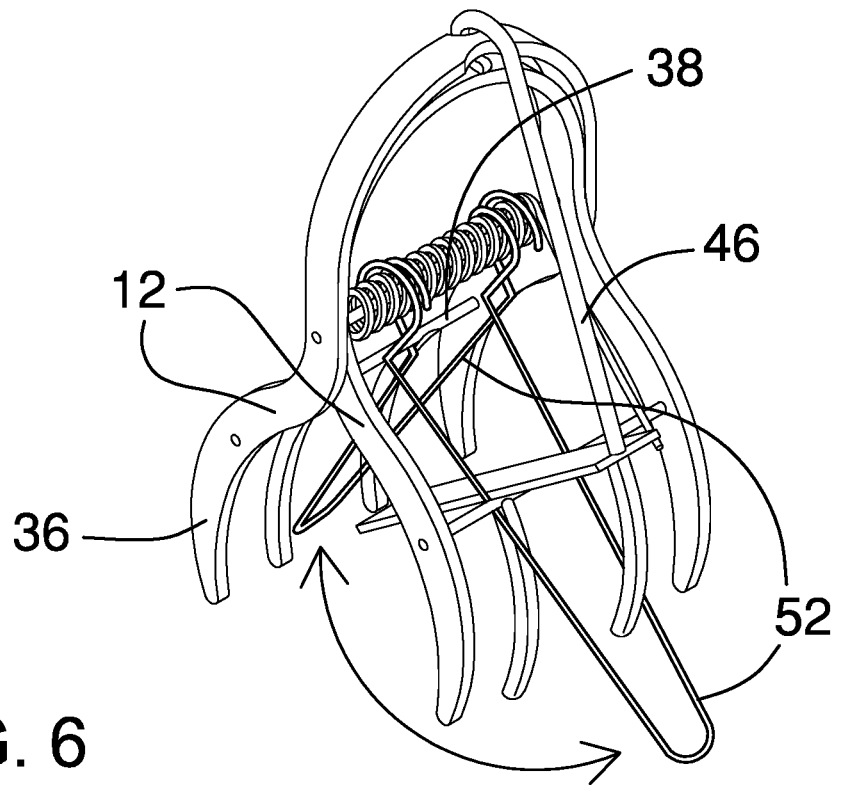
FIG. 6 is an isometric view of an embodiment of the disclosure.

With reference now to the drawings, and in particular to FIGS. 1 through 6 thereof, a new mole trap embodying the principles and concepts of an embodiment of the disclosure and generally designated by the reference numeral 10 will be described.

As best illustrated in FIGS. 1 through 6, the tined mole trap apparatus 10 generally comprises a pair of jaws 12 comprising an outer jaw 14 and an inner jaw 16. Each of the pair of jaws 12 has a U-shaped upper portion 18 and a pair of curved outer arms 20 extending from the upper portion 18. Each of the outer arms 20 tapers to a rounded point 22. The curvature of the pair of outer arms 20 of the outer jaw 14 and the inner jaw 16 is mirrored. An apex of the upper portion 18 of the outer jaw 14 has a thin portion 24 defined by a pair of rounded indents 26. A pair of crossbars 28 is coupled between the pair of outer arms 20 proximal the upper portion 18. A plurality of tines 30 is coupled to the pair of crossbars 28. The plurality of tines 30 comprises a pair of tines 30 coupled to each crossbar 28. The curvature of the tines 30 matches the pair of outer arms 20 coupled to the respective crossbar 28. The tines 30 of the crossbar 28 coupled to the outer jaw 14 may be offset from the tines 30 coupled to the inner jaw 16. The offset may be equal to a width of each tine 30 to allow the tines 30 of the inner jaw 16 and the tines of the outer jaw 14 to slidingly overlap.

A pivot rod 32 is coupled through the upper portion 18 of each of the pair of jaws 12 such that the inner jaw 16 pivotably moves within the outer jaw 14 between a clamped position 34 and a spread position 36. A spring 38 is coupled to the pivot rod 32. The spring 38 has a coiled portion 40 and a pair of extension arms 42 extending from the coiled portion 40. The pair of extension arms 42 engages the pair of crossbars 28 to force the pair of jaws 12 towards the clamped position 34. A trigger plate 44 is coupled to the crossbar 28 of the inner jaw 16. The trigger plate 44 may be rectangular. A set rod 46 is coupled to the outer jaw 14. The set rod 46 has a looped end 48 pivotably coupled around the thin portion 24 of the outer jaw 14 and a distal end 50 selectively engageable with the trigger plate 44 to maintain the pair of jaws 12 in the spread position 36. A pair of setting tools 52 each has a rounded V-shaped main portion 54 and a pair of hooked ends 56. The pair of hooked ends 56 is selectively engageable with the pivot rod 32. Each of the pair of hooked 56 ends lies in a plane perpendicular with a plane of the main portion 54.

In use, the setting tools 52 are used to secure the pair of jaws 12 in the spread position 36 while the set rod 46 is engaged with the trigger plate 44. Once engaged the setting tools 52 are removed and the apparatus 10 is placed into a mole hole. When a mole touches the trigger plate 44 the set rod 46 is disengaged and the pair of jaws 12 springs to the clamped position 34. The plurality of tines 30 allows smaller moles to be trapped and prevents escape.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A tined mole trap apparatus comprising:
a pair of Jaws comprising an outer jaw and an inner jaw, each of the pair of jaws having a U-shaped upper portion and a pair of curved outer arms extending from the upper portion, a curvature of the pair of outer arms of the outer jaw and the inner jaw being mirrored;
a pair of crossbars coupled to the pair of jaws, each of the pair of crossbars being coupled to and extending between the pair of outer arms proximal the upper portion of each of the pair of jaws;
a plurality of tines coupled to the pair of crossbars, a curvature of the tines matching the curvature of the pair of outer arms coupled to the respective crossbar;
a pivot rod coupled to the pair of jaws, the pivot rod coupled through the upper portion of each of the pair of jaws such that the inner jaw pivotably moves within the outer jaw between a clamped position and a spread position;
a spring coupled around the pivot rod, the spring engaging the pair of crossbars to force the pair of jaws towards the clamped position;
a trigger plate coupled to the crossbar of the inner jaw; and
a set rod coupled to the outer jaw, the set rod having a looped end pivotably coupled to the upper portion of the outer jaw and a distal end selectively engageable with the trigger plate to maintain the pair of jaws in the spread position.

2. The tined mole trap apparatus of claim 1 further comprising an apex of the upper portion of the outer jaw having a thin portion defined by a pair of rounded indents, the looped end of the set rod being coupled around the thin portion.

3. The tined mole trap apparatus of claim 1 further comprising each of the outer arms tapering to a rounded point.

4. The tined mole trap apparatus of claim 1 further comprising the plurality of tines comprising a pair of tines coupled to each of said pair of crossbars.

5. The tined mole trap apparatus of claim 1 further comprising the tines of the crossbar coupled to the outer jaw being offset from the tines of the crossbar coupled to the inner jaw.

6. The tined mole trap apparatus of claim 1 further comprising the spring having a coiled portion and a pair of extension arms extending from the coiled portion, the pair of extension arms engaging the pair of crossbars.

7. The tined mole trap apparatus of claim 1 further comprising a pair of setting tools, each of the pair of setting tools having a V-shaped main portion and a pair of hooked ends, the pair of hooked ends being selectively engageable with the pivot rod, the setting tools being used to secure the pair of jaws in the spread position.

8. The tined mole trap apparatus of claim 7 further comprising each of the pair of hooked ends lying in a plane perpendicular to a plane in which the main portion lies.

9. A tined mole trap apparatus comprising:
a pair of Jaws comprising an outer jaw and an inner jaw, each of the pair of jaws having a U-shaped upper portion and a pair of curved outer arms extending from the upper portion, each of the outer arms tapering to a rounded point, a curvature of the pair of outer arms of the outer jaw and the inner jaw being mirrored, an apex of the upper portion of the outer jaw having a thin portion defined by a pair of rounded indents;
a pair of crossbars coupled to the pair of jaws, each of the pair of crossbars being coupled to and extending between the pair of outer arms proximal the upper portion of each of the pair of jaws;
a plurality of tines coupled to the pair of crossbars, the plurality of tines comprising a pair of tines coupled to each of said pair of crossbars, a curvature of the tines matching the curvature of the pair of outer arms coupled to the respective crossbar, the tines of the crossbar coupled to the outer jaw being offset from the tines of the crossbar coupled to the inner jaw;
a pivot rod coupled to the pair of jaws, the pivot rod coupled through the upper portion of each of the pair of jaws such that the inner jaw pivotably moves within the outer jaw between a clamped position and a spread position;
a spring coupled to the pivot rod, the spring having a coiled portion and a pair of extension arms extending from the coiled portion, the pair of extension arms engaging the pair of crossbars to force the pair of jaws towards the clamped position;
a trigger plate coupled to the crossbar of the inner jaw;
a set rod coupled to the outer jaw, the set rod having a looped end pivotably coupled around the thin portion of the outer jaw and a distal end selectively engageable with the trigger plate to maintain the pair of jaws in the spread position; and a pair of setting tools, each of the pair of setting tools having a V-shaped main portion and a pair of hooked ends, the pair of hooked ends being selectively engageable with the pivot rod, each of the pair of hooked ends lying in a plane perpendicular to a plane in which the main portion lies, the setting tools being used to secure the pair of jaws in the spread position.

* * * * *